(12) United States Patent
Brown et al.

(10) Patent No.: US 8,140,555 B2
(45) Date of Patent: Mar. 20, 2012

(54) APPARATUS, SYSTEM, AND METHOD FOR DYNAMICALLY DEFINING INDUCTIVE RELATIONSHIPS BETWEEN OBJECTS IN A CONTENT MANAGEMENT SYSTEM

(75) Inventors: Albert C. Brown, Costa Mesa, CA (US); Stephen Hussey, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/433,382

(22) Filed: Apr. 30, 2009

(65) Prior Publication Data

US 2010/0281068 A1 Nov. 4, 2010

(51) Int. Cl.
*G06F 17/30* (2006.01)
(52) U.S. Cl. ........................................... 707/758
(58) Field of Classification Search ................ None
See application file for complete search history.

(56) References Cited

U.S. PATENT DOCUMENTS

| | | | |
|---|---|---|---|
| 5,946,681 A * | 8/1999 | Shorter ................. | 1/1 |
| 6,587,849 B1 * | 7/2003 | Mason et al. ........... | 1/1 |
| 6,687,707 B1 * | 2/2004 | Shorter ................. | 1/1 |
| 6,697,824 B1 | 2/2004 | Bowman-Amuah | |
| 7,089,237 B2 | 8/2006 | Turnbull et al. | |
| 7,383,285 B1 * | 6/2008 | Pal et al. ............... | 1/1 |
| 2003/0120652 A1 * | 6/2003 | Tifft .................... | 707/6 |
| 2007/0077995 A1 | 4/2007 | Oak et al. | |

OTHER PUBLICATIONS

Stolle et al, "A component-driven architecture for Internet-based directly reactive information systems", 2000.
Choy, "Integration of Structured and Unstructured Data in IBM Content Manager", 2005.
Dourish et al., "Extending Document Management Systems With User-Specific Active Properties", 2000.
Nguyen et al., "Component-based Version Management for Embedded Computing System Design", 2007.
Dobson et al., "A Survey of Autonomic Communications", 2006.
System Overview, IBM FileNet P8, Version 4.0, Copyright IBM Corp. 2001, 2008.

* cited by examiner

*Primary Examiner* — Apu Mofiz
*Assistant Examiner* — Thu Nga Nguyen
(74) *Attorney, Agent, or Firm* — Kunzler Needham Massey & Thorpe

(57) ABSTRACT

An apparatus, system, and method are disclosed for defining inductive relationships between content objects in a content management system. The system includes a content engine server that stores at least two content objects having a set of attributes. An attribute selection module selects an attribute of the content objects for identification of an inductive relationship. A comparison module compares the attribute value of the attribute selected of a first content object with the attribute value of a second content object. An inductive relationship module dynamically defines an explicit relationship between the first content object and the second content object in response to the first attribute value and the second attribute value satisfying a match criteria. The explicit relationship is preserved in an inductive relationship database. User-defined content management rules may then be applied to the inductively related content objects such as records management, retention, or launching business processes.

2 Claims, 2 Drawing Sheets

APPARATUS, SYSTEM, AND METHOD FOR DYNAMICALLY DEFINING INDUCTIVE RELATIONSHIPS BETWEEN OBJECTS IN A CONTENT MANAGEMENT SYSTEM

FIELD OF THE INVENTION

This invention relates to content management systems and more particularly relates to defining relationships between content objects located within a content management system.

BACKGROUND

Description of the Related Art

Content management systems express relationships between separate content objects via user-defined links that are set manually. But many relationships are implicit in content metadata, such as content object properties, state, type, format, or classification in a taxonomy or records management fileplan. It is difficult to apply content management operations to a set of content objects that are implicitly related in this way, unless explicit links have been defined. In the absence of explicit links between objects which would facilitate applying a content management operation in one action to a set of related objects, objects must be identified one by one and the content management operation applied to each object individually.

BRIEF SUMMARY

From the foregoing discussion, it should be apparent that a need exists for an apparatus, system, and method that dynamically defines inductive relationships between content objects in a content management system.

The present invention has been developed in response to the present state of the art, and in particular, in response to the problems and needs in the art that have not yet been fully solved by currently available content management systems. Accordingly, the present invention has been developed to provide an apparatus, system, and method for defining inductive relationships that overcome many or all of the above-discussed shortcomings in the art.

The apparatus to define inductive relationships between objects in a content management system is provided with a plurality of modules configured to functionally execute the steps necessary to define inductive relationships between content objects in a content management system. These modules in the described embodiments include a content engine server, an attribute selection module, a comparison module, an inductive relationship module, an inductive relationship database and a user interface.

The content engine server stores at least two content objects, with each content object being stored in a repository. Each repository is configured to store content in one or more of a database, a file system and a worm device. Each content object has a set of attributes such as an attribute value, a content object type, a taxonomy location, a content object format, a location in a business process, and a content object lifecycle state.

The attribute selection module selects an attribute which could be a field defined on the object, its location, or other information about the object of the at least two content objects to identify an inductive relationship. The comparison module compares the selected attribute of the at least two content objects. The comparison module compares a first attribute value of a first content object to a second attribute value of a corresponding attribute of a second content object.

The inductive relationship module dynamically defines an explicit relationship between the first content object and the second content object if the first attribute value and the second attribute value satisfy a match criteria. In certain embodiments the match criteria comprises an exact match between the first attribute value and the second attribute value. In other embodiments the match criteria may comprise a predefined range of values for the first attribute value and a predefined range of the values of the second attribute value. The explicit relationship is defined exclusively by a computer program product based on the inductive relationship between the first content object and the second content object. The explicit relationship is configured to be used with a user-defined content management operation rule for the at least two content objects. The user-defined content management operation rule may be applied to one or more user-defined relationships and/or the dynamically defined explicit relationship defined by the computer program product.

The inductive relationship database stores the dynamically defined explicit relationships on the content engine server. The user interface makes the inductive relationship database available for applying the user-defined content management operation rules to a set of content objects that have been defined by the dynamically defined explicit relationship.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
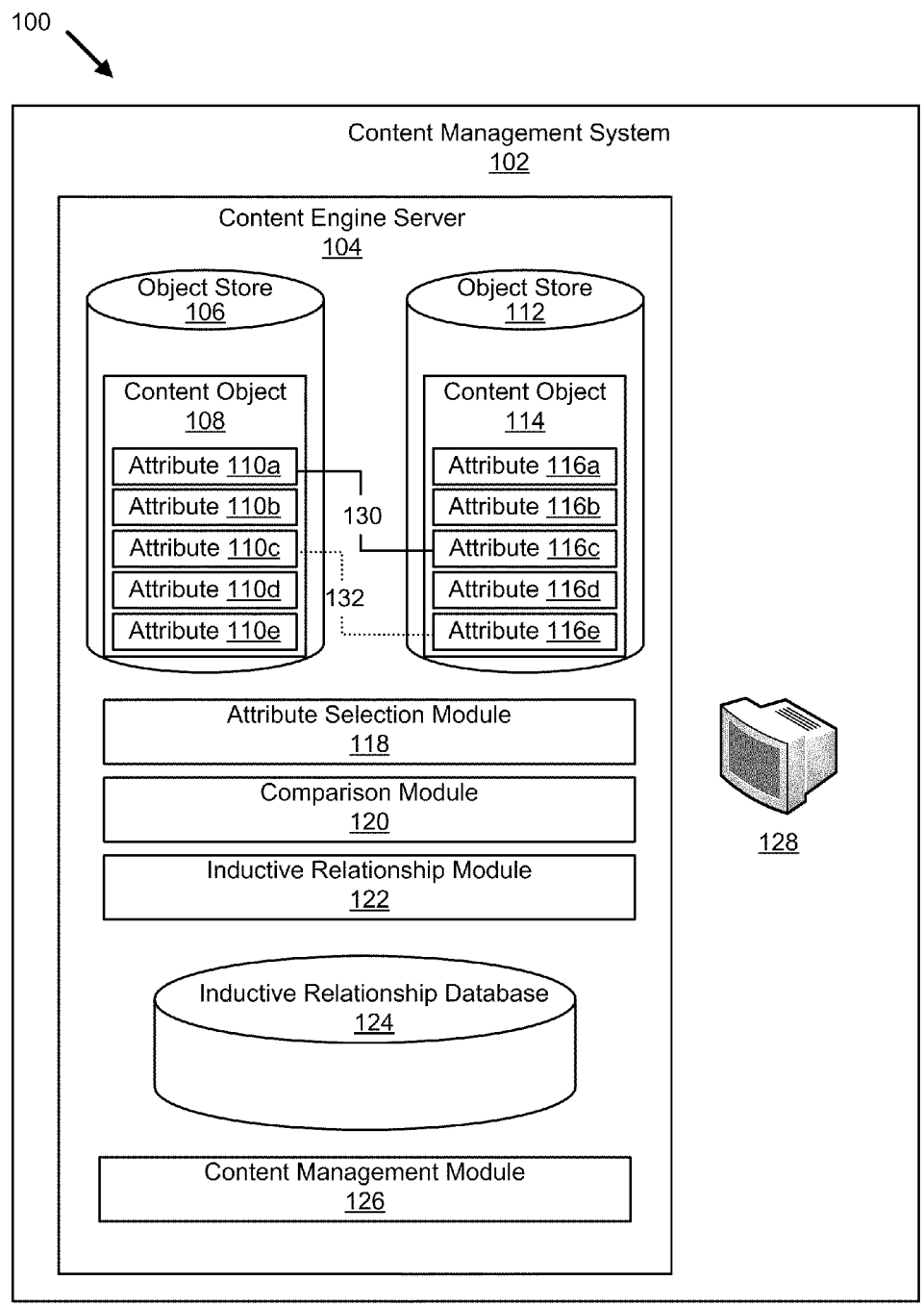
FIG. 1 is a schematic block diagram illustrating one embodiment of a system for defining inductive relationships between content objects in a content management system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium or computer program product may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 for defining inductive relationships between objects in a content management system 102. The system 100 includes the content management system 102, at least two content objects 108 and 114 stored on content object stores 106 and 112 also called repositories 106 and 112, each content object comprising a set of attributes 110a-110e and 116a-116e respectively, an attribute selection module 118, a comparison module 120, an inductive relationship module, an inductive relationship database 124, a content management module 126 and a display interface 128.

The content management system 102 comprises an enterprise platform that captures, stores, manages, secures and processes electronic information for an organization. The content management system 102 facilitates, organizes and controls the publication and storage and retrieval of large quantities of documents and content. In certain embodiments the content management system 102 comprises an IBM FileNet P8 content management system.

Object stores 106 and 112 also called repositories 106 and 112 are repositories created and managed within content management system 102. The object stores 106 and 112 also called repositories 106 and 112 are configured to store content objects such as content objects 108 and 114 in a database, a file system, WORM device, or similar content storage system. In certain embodiments a WORM device includes a computer storage system, data storage device or data storage medium that can be written to only once but read from multiple times. While the embodiment illustrated in Figure contains two object stores 106 and 112 also called repositories 106 and 112 containing content objects 108 and 114 one skilled in the art will recognize that in certain embodiments the content management systems may comprise a plurality of content objects stored in a plurality of object stores or repositories. Thus, the present invention is not limited to two content objects 108 and 114 stored within two object stores 106 and 112 also called repositories 106 and 112.

Each object store 106 and 112 also called repositories 106 and 112 is capable of storing a variety of enterprise related data, for example the object store may be configured to store customer account information, product information or virtually any type of structured or unstructured content such as XML documents, word processing documents, databases, spreadsheets, web pages, photos, voice data, images, templates or any other digital information.

Content object 108 comprises a set of attributes 110a-110e unique to content object 108. Similarly, content object 114 comprises a set of attributes 116a-116e which are unique to content object 114. While the set of attributes 110a-110e or 116a-116e may be unique to content object 108 and 114 respectively, individual attributes 110a-110e and 116a-116e may not be unique to a particular content object. Accordingly, in certain embodiment a particular attribute may be shared by two or more content objects. In certain embodiments the entire set of attributes for one content object may be identical to a set of attributes for another content object. In certain embodiments the set of attributes 110a-110e or 116a-116e include an attribute value, a content object type, a taxonomy location, a content object format, a location in a business process, a content object lifecycle state, or any other digitally stored attribute.

In certain embodiments content management system 102 expresses a user-defined relationship 130 between separate content objects such as content objects 108 and 114 via an express link that is manually set by an operator of the system 100. The user-defined relationship 130 may be predefined such that any content objects meeting the express criteria may be linked upon input of the content object into the system 100 or the user-defined relationship may be manually identified by a user after the content object has been input into the system 100. In either embodiment, the user-defined relationship 130 is expressly defined by the user. In one embodiment the user-defined relationships 130 are defined one by one and content management operations are applied to each content object 108 or 114 individually.

Many relationships are implicit in the content attributes 110a-110e and 116a-116e of each content object 108 and 114 such as content object properties, state, type, format, classification in a taxonomy or records management file plan, etc. An inductive or inferred relationship is dynamically defined from the content objects 108 and 114 where the content attributes 110a-110e and 116a-116e match. Where a relationship is identified and defined between content objects, content management operations can be applied to a set of inductively-related objects in a single action. A nonexclusive set of examples of inductive relationships include:

All objects with a similar or same property value (All invoices paid on the same day, All invoices submitted by Sue);

All objects belonging to the same element in a taxonomy (All documents in folder Al's 2004 paystubs, All objects in Project Tango);

All objects with a similar type (All invoices, All pay stubs, All engineering documents);

All objects with in a similar format (All images, All word documents);

All objects belonging to same state (All approved object, all approved engineering drawings); and All objects with matching value derived from the unstructured content. Furthermore, inductive relationships may be identified by combining attributes such as all invoices (a type of object) paid on Tuesday (a property value) in project Tango (taxonomy). One skilled in the art will recognize that the above list is simply offered as an example of some inductive relationships that may be identified or defined by system 100 and that there are many other inductive relationships that may be identified.

To identify an inductive relationship and define a corresponding explicit relationship 132 between content objects such as content objects 108 and 114 when a match between the content attributes 110a-110e and 116a-116e is identified the attribute selection module 118 selects an attribute implicit in the content attributes to compare in the comparison module 120.

The comparison module 120 compares attribute values, such as attributed values 110a-110e of a first content object, such as content object 108 with the attribute values of a second content object such as attribute values 116a-116e of content object 114. While the embodiment illustrated in FIG. 1 comprises two content objects 108 and 114, one skilled in the art will recognize that in certain embodiments the system 100 may comprise many content objects. The comparison module 120 compares a first attribute value such as one of attribute values 110a-110e of a first content object such as content object 108 with a corresponding attribute value of a second corresponding content object such as one of the attribute values 116a-116e of content object 114 that corresponds to the first attribute value. The comparison module 120 may compare the attributes of a single content object with the attributes of another content object. In certain embodiments the comparison module 120 compares the attributes of a single content object with the attributes of multiple content objects.

The inductive relationship module 122 dynamically/automatically defines the explicit relationship 132 between content objects based on the attribute values compared by the comparison module 120 satisfying a match criteria. For example, in the embodiment illustrated in FIG. 1, where the comparison module 120 identifies a match between one of the content attributes 110a-110e of content object 108 such as attribute 110c and a corresponding content attribute 116a-116e of content object 114 such as attribute 116e, the inductive relationship module 122 defines an explicit relationship 132 between the two content objects 108 and 114 based on attribute 110c and 116e satisfying a match criteria. Once a match is identified, the inductive relationship module 122 then dynamically defines the explicit relationship 132 between attribute 110c and attribute 116e. The explicit relationship 132 is defined exclusively by the computer program product based on the inductive relationships identified between the attributes of the content objects.

In certain embodiments the match between content attributes 110a-110c and 116a-116c may be based on a match criteria. In one embodiment the match criteria may be a range within which the attributes may fall to constitute a match.

Once the inductive relationships are identified by the comparison module 120 and dynamically defined as an explicit relationship 132 by the inductive relationship module 122, the explicit relationship is preserved in an inductive relationship database 124. Once defined, an explicit relationship 132 may be modified or removed by a user if desired.

In certain embodiments the system 100 includes a user interface 128 to make the dynamically defined inductive relationship link database 124 available for applying user-defined content management operation rules to the content objects identified as including an inductive relationship. In one embodiment the user interface 128 may include user-defined relationships such as the user-defined relationship 130 in addition to the explicit relationships such as explicit relationship 132 which are dynamically defined and stored in the inductive relationship link database 124 as described above.

As a result of the dynamically defined explicit relationship 132 content management operation rules may be applied to the inductively related content objects. For example, in certain embodiments a content management module 126 is configured to apply user-defined content management operation rules to a set of the content objects such as content objects 108 and 114 which have been dynamically defined as including an inductive relationship. Content management operation rules may include operations such as checkout, classify, apply security, delete, etc. Examples of content management operation rules that apply functionality to the explicit relationships stored in the inductive relationship link database 124 include the following:

Launch a review workflow on all invoices (type) paid on Tuesday (property value) in project Tango (taxonomy) by Sue;
Classify objects based on inductive relationships into new taxonomy locations;
Set metadata based on inductive relationships;
Create explicit relationships based on inductive relationships;
Prevent deletion of an object if it belongs to an inductive relationship;
Publish a set of documents belonging to an inductive relationship;
Applying legal holds;
Launching a business process;
Setting attributes;
Modifying a folder location on related objects.

Additionally, the content management operations rules may include policies that are set and applied to the explicit relationships 132 stored in the inductive relationship link database 124 according to the attributes of each content object. In one embodiment an administrator may apply content management operation rules that manage the policies for a set of inductively related content objects. For example the administrator may set security policies for all invoices from a particular individual. Other examples of policies which may be applied include setting retention policies, setting records management policies, setting approval workflows, setting lifecycle policies, etc. One skilled in the art will recognize that these policies are merely examples of numerous policies which may be set by an administrator or other user and that additional policies are included within the scope of the present invention. Similarly, one skilled in the art will recognize that the above enumerated functionality content management operation rules are likewise merely examples of content management operation rules that apply functionality to the explicit relationships 132 and that that additional functionality rules are included within the scope of the present invention.

Figure 2:
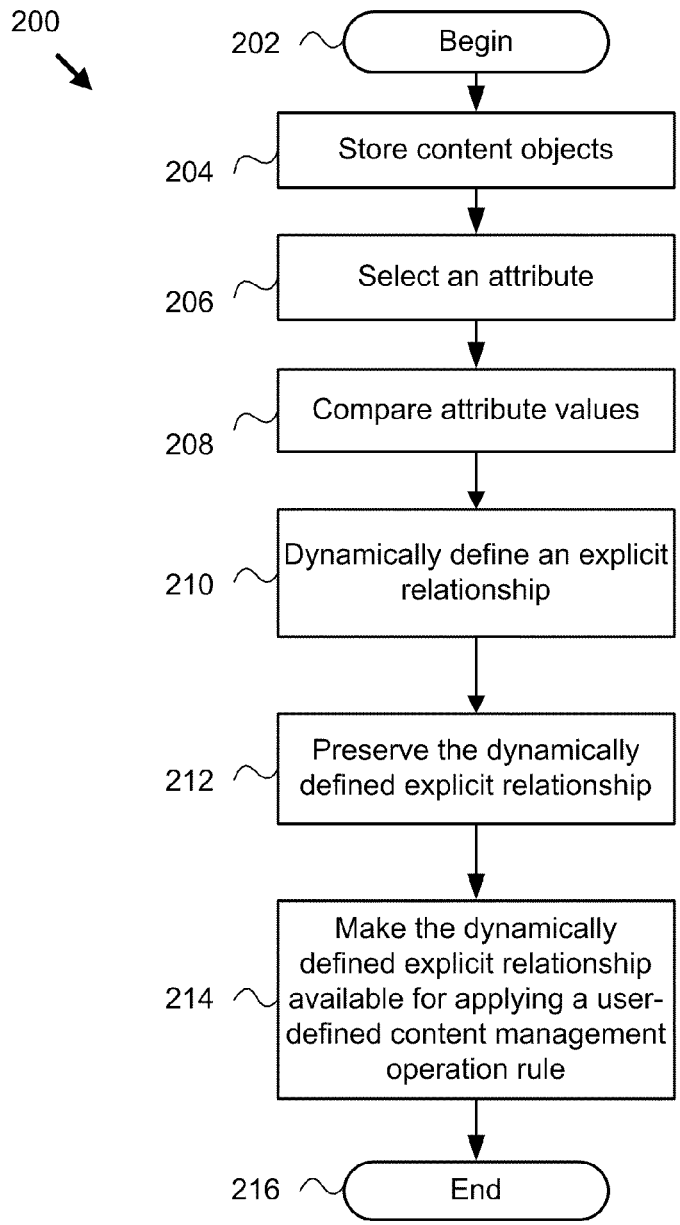
FIG. 2 is a schematic flow chart diagram illustrating one embodiment of a method for defining inductive relationships between content objects in a content management system in accordance with the present invention.

FIG. 2 illustrates a method 200 for defining inductive relationships between objects in a content management system such as content management system 102 of FIG. 1. The method begins 202 and at least two content objects such as content objects 108 and 114 are stored 204 on a content engine server such as content engine server 104. In certain embodiments the content objects are stored 204 in an object store such as object stores 106 and 112 on the content engine server 104. An attribute of the at least two content objects is selected 206 for the identification of an inductive relationship. A first attribute value of an attribute of a first content object is compared 208 to a second attribute value of a corresponding attribute in a second content object. If the first attribute value and the second attribute value satisfy a match criteria an explicit relationship is dynamically defined 210 between the first content object and the second content object. In certain embodiments the match criteria may be an exact match. In other embodiments the match criteria may be a range of values within which the first attribute value and the second attribute value may fall in order to satisfy the match criteria. In either case, the explicit relationship is exclusively defined by a computer program product based on an inductive relationship between the attribute values of the first content object and the second content object. The dynamically defined explicit relationships are preserved 212 in an inductive relationship link database 124 on the content engine server. The inductive relationship link database 124 is made available 214 for applying a user-defined content management operation rule and the method 200 ends 216. Thus, the method 200 of FIG. 2 allows a user to apply a user-defined content management operation rule to a set of content objects which are inductively related and defined by an explicit relationship.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code executable to perform operations for defining inductive relationships between content objects in a content management system, the operations of the computer program product comprising:

storing at least two content objects on a content engine server comprising a processor and a memory, each content object stored in a repository, each repository configured to store content in a WORM device, each content object comprising a set of attributes, the set of attributes comprising an attribute value, a content object type, a taxonomy of storage location, a content object format, a location in a business process, and a content object lifecycle state;

selecting each attribute of the at least two content objects for identification of an inductive relationship;

comparing a first attribute value of each attribute of a first content object to a second attribute value of a corresponding attribute of a second content object;

dynamically defining an explicit relationship between the first content object and the second content object in response to the first attribute value and the second attribute value satisfying a match criteria comprising a same attribute value, a same taxonomy of storage location, a same content object type, a same content object format, a same state of approval, and all objects with a matching value from unstructured content, the explicit relationship defined exclusively by the computer program product based on the inductive relationship, the explicit relationship configured for use in a user-defined content management operation rule for the at least two content objects, wherein the user-defined content management operation rule comprises applying records management controls, applying legal holds of document deletion, launching a business process, setting attributes, and modifying a folder location on related objects;

preserving the dynamically defined explicit relationship in an inductive relationship database of the content engine server;

making the inductive relationship database available for applying the user-defined content management operation rule to the content objects defined by the dynamically defined explicit relationship; and applying the user-defined content management operation rule to the content objects defined within the dynamically defined inductive relationship, a user-defined relationship, and the dynamically defined explicit relationship defined by the computer program product.

2. An apparatus for defining inductive relationships between objects in a content management system, the apparatus comprising:
  a content engine server comprising a processor and a memory that stores at least two content objects, each content object stored in a repository, each repository configured to store content in one or more storage systems, the one or more storage systems comprising a WORM device, each content object comprising a set of attributes, the set of attributes comprising an attribute value, a content object type, a taxonomy of storage location, a content object format, a location in a business process, and a content object lifecycle state, the content engine server further comprising:
  an attribute selection module that selects each attribute of the at least two content objects for identification of an inductive relationship;
  a comparison module that compares a first attribute value of each attribute of a first content object to a second attribute value of a corresponding attribute of a second content object;
  an inductive relationship module that dynamically defines an explicit relationship between the first content object and the second content object in response to the first attribute value and the second attribute value satisfying a match criteria comprising a same attribute value, a same taxonomy of storage location, a same content object type, a same content object format, a same state of approval, and all objects with a matching value from unstructured content, the explicit relationship defined exclusively by a computer program product based on the inductive relationship, the explicit relationship configured for use in user-defined content management operation rules for the at least two content objects, wherein the user-defined content management operation rule comprises applying records management controls, applying legal holds of document deletion, launching a business process, setting attributes, and modifying a folder location on related objects, the user-defined content management operation rules applied to one or more of a user-defined relationship and the dynamically defined explicit relationship defined by the computer program product;
  an inductive relationship database that preserves the dynamically defined explicit relationship on the content engine server;
  a user interface that makes the inductive relationship database available for applying the user-defined content management operation rule to the content objects defined by the dynamically defined explicit relationship; and
  the content engine server applying the user-defined content management operation rule to the content objects defined within the dynamically defined inductive relationship, a user-defined relationship, and the dynamically defined explicit relationship defined by the computer program product.

* * * * *